May 20, 1952  M. C. WILLS ET AL  2,597,692
BUCKET DUMPING MECHANISM FOR DUMP TYPE SCOOPS
Filed July 19, 1947  3 Sheets-Sheet 1

INVENTORS,
Marion C. Wills,
BY Wayne J. Wills.

Roy E. Hamilton,
Attorney.

May 20, 1952     M. C. WILLS ET AL     2,597,692
BUCKET DUMPING MECHANISM FOR DUMP TYPE SCOOPS
Filed July 19, 1947     3 Sheets-Sheet 3

INVENTORS,
Marion C. Wills,
Wayne J. Wills.
BY
Roy E. Hamilton,
Attorney.

Patented May 20, 1952

2,597,692

UNITED STATES PATENT OFFICE 2,597,692

BUCKET DUMPING MECHANISM FOR DUMP TYPE SCOOPS

Marion C. Wills and Wayne J. Wills, Topeka, Kans.

Application July 19, 1947, Serial No. 762,032

3 Claims. (Cl. 214—131)

This invention relates to improvements in scraper attachments for tractors, and has particular reference to a scraper of the back dump type.

The principal object of the present invention is the provision of a scraper attachment adapted to be attached directly to the rear axle of the tractor.

Another object of the invention is the provision of a scraper attachment for a tractor adapted to be operated by the hydraulic power system of the tractor to raise and lower the loaded scraper for carrying and dumping.

A further object is the provision of a scraper attachment for a tractor that is closely hitched to the back axle of the tractor and conveniently operable by the operator positioned on the tractor seat.

Other objects are simplicity and ruggedness of construction, ease of attachment, and ease and efficiency of operation.

With these objects in view, as well as other objects which will appear during the course of the specification, reference will now be had to the drawings wherein—

Fig. 2 is a side elevational view substantially as shown in Figure 1, with the scraper in the lowered position.

Fig. 3 is a plan view of the scraper as shown in Figure 2, with some of the tractor parts deleted.

Fig. 4 is a perspective view of the connecting members detached from the tractor and in the emptying position.

Fig. 6 is a detached plan view of the H-frame.

Figure 1:
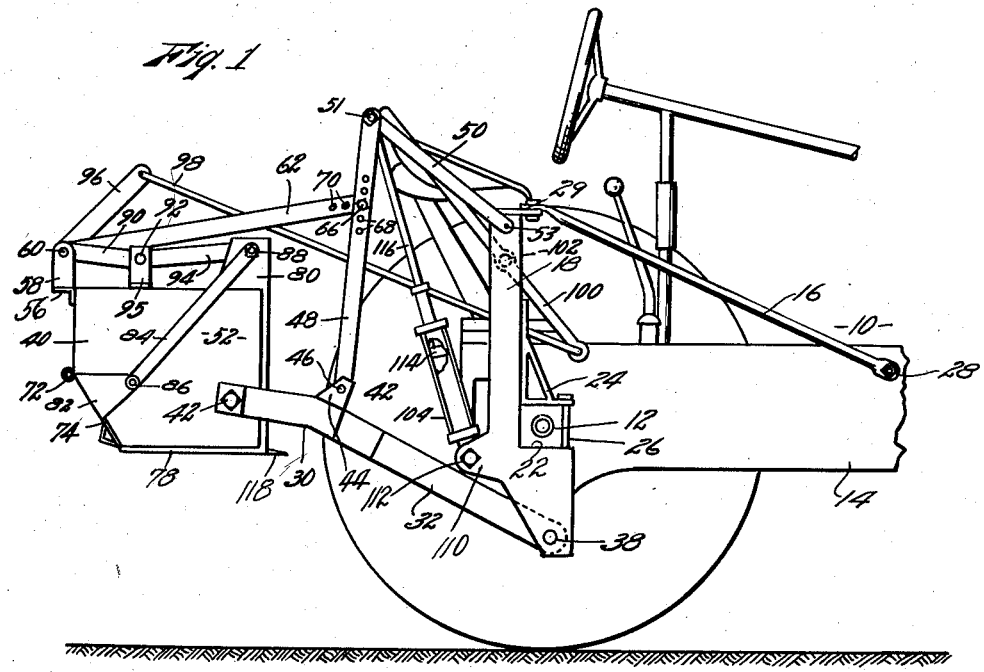
Figure 1 is a side elevational view of a scraper attached to a tractor, shown in the raised carrying position and embodying this invention.

Throughout the several views like reference characters refer to similar parts and the numeral 10 designates any of typical farm tractors having a rear axle housing 12 and being provided with suitable hydraulic power system, not shown.

That portion of the structure, best shown in Figure 1, discloses the attachment which is adapted to be attached to the tractor axle housing 12 and braced to the tractor frame 14 by means of rods 16.

Standards 18 and 20 offset intermediate their ends at 22 and provided with a bracket 24 spaced above offset 22 serve to form a recess 21 to receive axle housing 12 therebetween (see Figure 1). A bolt 26 extending through bracket 24 and into offset 22 is adapted to clampingly fasten the standards to axle housing 12. By removing bolts 29 which secure the rods 16 to the upper ends of standards 18 and 20 and the screws 28 which secure the forward ends of tie rods 16 to the tractor frame 14, the entire scraper attachment structure may be removed from the tractor. It will be noted that rear end of tie rods 16 are respectively attached to the upper ends of the standards by bolts 29, thus presenting means for preventing rearwardly sagging of the standards when a load is applied.

An H-frame 30 having side arms 32 and 34 and an intermediate cross member 36 is pivoted at its front extremities by bolts 38 to standards 18 and 20 below axle frame 12, and at its rear end to opposite ends of a scraper frame 40 by means of bolts 42. Cross member 36 is provided adjacent its opposite sides with a pair of spaced apart upwardly projecting ears 44 to which is pivotally mounted at 46 spaced apart bars 48 which are disposed in substantially parallel relation to standards 18 and 20 respectively and are pivotally joined to the upper ends of the respective standards by links 50 which are positioned substantially parallel with 32 and 34. Pin 51 connects links 50 with bars 48 and the forward ends of the links are pivoted to standards 18 and 20 respectively by bolts 53. Scraper frame 40 comprises a sheet of metal formed and bent to present ends 52 and a rear wall 54 with a cut-away lower portion whereby the vertical width of wall 54 is less than that of the end members. The upper edge of wall 54 is reenforced by means of an angle iron 56 to which is attached a plurality of upwardly extended bearings 58 in which is rotatably mounted a horizontally disposed shaft 60 which extends substantially the full length of the scraper. Shaft 60 is interconnected with the bars 48 by spaced apart links 62 which are pivoted at their respective outer ends to shaft 60 at 64 and at their inner ends to adjacent bars 48 by pins 66.

Links 62 are disposed in parallel relation adjacent opposite ends of the scraper frame. A series of holes 68 pass through each of bars 48 to receive pins 66 whereby the tilting of the scraper frame may be adjusted for reasons hereinafter set forth, also, each link 62 is provided with a plurality of holes 70 for varying the effective length of links 62.

Pivotally mounted along the lower edge of rear wall 54 by means of hinges 72 is a gate 74 which is adapted to be moved to abut against the forwardly and downwardly inclined edges 76 of scraper ends 52, to form an inclined bottom portion of the scraper body when the scraper is in operation.

The bottom 78 of the scraper 40 has transversely disposed end plates 80 which are upwardly tapered to lie snugly between end walls 52 and to extend thereabove as shown in Figure 1. These end plates 80 are pivoted adjacent the forward lower ends by bolts 42 to the respective arms 32 and 34 whereby the bottom is adjustable to and from the closed position.

The gate 74 is provided at each of its opposite ends with forwardly projecting tongue 82 which overlaps and is slightly spaced apart from the outer face of the adjacent end 52 of the scraper. Connecting link 84 disposed on the outside of end plate 52 is pivoted to tongue 82 at 86. The upper end of link 84 extends above end plate 52 and is pivoted at 88 to the upper extremity of the bottom end plate 80. This positioning of the gate 74 and the bottom member 78 by means of links 84 is such that when the bottom plate 74 is disposed in a horizontal position, as shown in Figure 1, the gate 74 will be secured tightly against the inclined edge 76 of end plate 52, thereby completely closing the scraper for loading and for transporting a load to a desired position for dumping. This link connection between the parts is so arranged that when the bottom member is pivoted to the dumping position, as clearly shown in Figure 5, the gate 74 will be moved rearwardly to a position substantially parallel with the bottom member 78, thus insuring a complete opening of the parts whereby the load may be readily discharged.

Each of the end plates 80 is provided with operating means including a lever arm 90 rigidly attached to shaft 60, the upper end of said arm being pivotally connected by a pin 92 to link 94 which is pivotally connected at its other end by means of pivot 88 to the upper extremity of end plate 80. The relative lengths of lever arm 90 and link 94 are so proportioned that when in substantially straight alignment they will maintain the gate and bottom sections in fixed closed position.

Referring to Figure 1, which shows the scraper in the closed position, it will be noted that the lever arm 90 and the link 94 are disposed in slightly offset relation and that a stop member 95 which is rigidly attached to arm 90 is in position to rest on the top of end plate 52 to prevent further downward breaking of the joint between the arm 90 and link 94, thus securing the parts in the closed position against the load being carried.

It is quite apparent that the load may be dumped by simply rotating shaft 60 in the reverse direction to break the joint between arm 90 and link 94 upwardly so that the load in the scraper will exert a downward pressure, thus causing a quick opening of the scraper.

Means for controlling the load comprises a lever arm 96 rigidly secured to shaft 60 and interconnected by rod 98 to a lever 100 which is pivoted intermediate its ends at 102 to standard 18. This lever 100 is so positioned as to be in convenient position to be operated by the operator located on the seat of the tractor 10.

Means for raising and lowering the scraper comprises a pair of hydraulic jacks 104, one being disposed in each side of the scraper structure, as shown in Figures 1, 2, 3 and 4. This jack comprises a cylinder 106 having a base 108 pivoted between ears 110 integral with standards 18 and 20 respectively by means of pivot 112. A piston 114 is slidably mounted in cylinder 106 and is provided with a piston rod 116 which is secured to its upper end by pin 51 to the upper extremity of bars 48.

It will be noted that the jack is diagonally positioned between the parts so that when fluid pressure is delivered through tube 105 to cylinder 106 against piston 114, the scraper will be raised, and then by releasing the pressure in the cylinder the weight of the scraper will cause it to be lowered to a position against the ground for loading.

Figure 5:
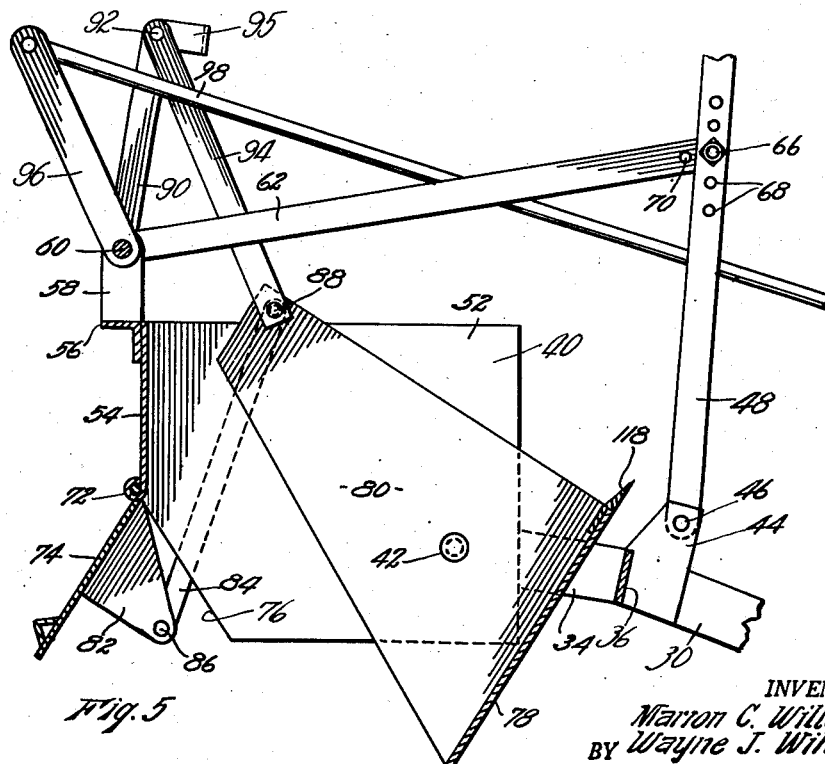
Fig. 5 is an enlarged sectional view through the scraper showing it in the dumping position.

As best shown in Figures 3 and 5, it will be noted that the hinged bottom member 78 is provided at its forward edge with a straight blade 118 which is removably secured thereto by means of bolts 120. In order to present the blade at the proper angle to the earth being loaded, the link 62 may be adjusted for varying the tilt of the bottom of the member 78 to the ground surface.

When the scraper bucket is closed after it has deposited a load to the rear thereof, it may be lowered and used as a bulldozer by simply backing the tractor to push said dump load to any desired position. When using it as a bulldozer the bucket may be raised to any desired height by means of the power take-off means. This use of the device may be utilized for filling ditches where during the digging operation the dirt has been deposited adjacent the ditch.

It is quite apparent that by attaching the scraper unit directly to the rear axle of the tractor, the structure is extremely rigid and stable, and can be easily operated by the tractor driver located on the seat adjacent the tractor control parts.

What we claim as new and desire to protect by Letters Patent is:

1. In combination with a powered vehicle having an axle housing and a power take-off, a pair of vertically disposed standards detachably secured to said axle housing, a frame secured for pivotal movement at its forward ends to the lower extremities of said standards, a scraper bucket pivoted to the rear ends of said frame, means carried by said standards and actuated by said power take-off to raise said scraper bucket above the ground surface, said scraper bucket having a hinged rear gate and a pivoted bottom member, and a toggle linkage interconnecting said gate and bottom member, whereby they are simultaneously operated to open and close said scraper bucket, said toggle linkage having a dead center position at which said gate and bottom member are secured in the closed position.

2. In combination with a powered vehicle having an axle housing and a power take-off, a pair of vertically disposed standards detachably secured to said axle housing, a frame secured for pivotal movement at its forward ends to the lower extremities of said standards, a scraper bucket pivoted to the rear ends of said frame, means carried by said standards and actuated by said power take-off to raise said scraper bucket above the ground surface, said scraper bucket having a hinged rear gate and a pivoted bottom member, means interconnecting said gate and bottom member, whereby they are simultaneously operated to open and close said scraper bucket, and means carried by said bucket and operable as said bucket is closed to normally secure said rear gate and bottom member in the closed position.

3. In combination with a powered vehicle having an axle housing and a power take-off, a pair of vertically disposed standards detachably secured to said axle housing, a frame secured for pivotal movement at its forward ends to the lower extremities of said standards, a scraper bucket pivoted to the rear ends of said frame, means carried by said standards and actuated by said power take-off to raise said scraper bucket above the ground surface, said scraper bucket having a hinged rear gate and a pivoted bottom member, means interconnecting said gate and bottom member, whereby they are simultaneously operated to open and close said scraper bucket, means carried by said bucket and operable as said bucket is closed to normally secure said rear gate and bottom member in the closed position, and manually operable means to release said securing means whereby said bucket will be caused to open by gravity.

MARION C. WILLS.
WAYNE J. WILLS.

REFERENCES CITED

The following references are of record in the file of this patent:

UNITED STATES PATENTS

| Number | Name | Date |
|---|---|---|
| 1,958,195 | Le Bleu | May 8, 1934 |
| 2,110,186 | Weimer | Mar. 8, 1938 |
| 2,328,715 | Drott | Sept. 7, 1943 |
| 2,329,241 | Berney | Sept. 14, 1943 |
| 2,341,179 | Hipple | Feb. 8, 1944 |
| 2,364,121 | Arps | Dec. 5, 1944 |
| 2,368,156 | Orelind et al. | Jan. 30, 1945 |
| 2,454,475 | Owen | Nov. 23, 1948 |
| 2,496,874 | Holopainen | Feb. 7, 1950 |